(12) United States Patent
Kani et al.

(10) Patent No.: US 6,198,385 B1
(45) Date of Patent: Mar. 6, 2001

(54) ENTERING DETECTING SYSTEM FOR VEHICLES

(75) Inventors: Hiroyuki Kani, Nishio; Fumio Asakura, Okazaki; Tadashi Nakamura, Hoi-gun; Toru Yoshida, Kariya; Takeo Tsuzuki, Toyota, all of (JP)

(73) Assignees: Nippon Soken, Inc., Nishio; Denso Corporation, Kariya, both of (JP)

( * ) Notice: Subject to any disclaimer, the term of this patent is extended or adjusted under 35 U.S.C. 154(b) by 0 days.

(21) Appl. No.: 09/438,377

(22) Filed: Nov. 12, 1999

(30) Foreign Application Priority Data

Nov. 11, 1998 (JP) .................................. 10-320960

(51) Int. Cl.[7] .................................................. B60R 25/10
(52) U.S. Cl. .............................. 340/426; 340/554; 367/94
(58) Field of Search .............................. 340/426, 425.5, 340/554, 541, 540; 367/94, 93

(56) References Cited

U.S. PATENT DOCUMENTS

| 4,012,730 | * | 3/1977 | Nicholls ................................ | 340/554 |
| 4,114,146 | * | 9/1978 | Inoue et al. ............................ | 367/93 |
| 4,290,126 | * | 9/1981 | McFadyen et al. ..................... | 367/93 |
| 5,808,544 | * | 9/1998 | Kani et al. ............................ | 340/426 |
| 5,856,778 | * | 1/1999 | Kani et al. ............................ | 340/426 |

FOREIGN PATENT DOCUMENTS

| 0 032 278 | 7/1981 | (EP) . |
| 2 310 720 | 9/1997 | (GB) . |
| 53-3799 | 1/1978 | (JP) . |
| 6-144159 | 5/1994 | (JP) . |

OTHER PUBLICATIONS

J Markus, "Modern Electronic Circuits Reference Manual", Published 1980, McGraw Hill Book Company, see chapter 45 especially pp. 495, 497.

* cited by examiner

Primary Examiner—Jeffery A. Hofsass
Assistant Examiner—Sihong Huang
(74) Attorney, Agent, or Firm—Pillsbury Madison & Sutro LLP

(57) ABSTRACT

In an entering detecting system for vehicles, a received ultrasonic signal is amplified by an amplifier circuit so that a Doppler signal may be generated from an amplified signal and a transmission signal for detecting an entering of unauthorized person into a vehicle compartment. An operational amplifier circuit of the amplifier circuit has an output limiter circuit. The output limiter circuit has diode series circuits which are connected to a feedback resistor of an operational amplifier.

8 Claims, 8 Drawing Sheets

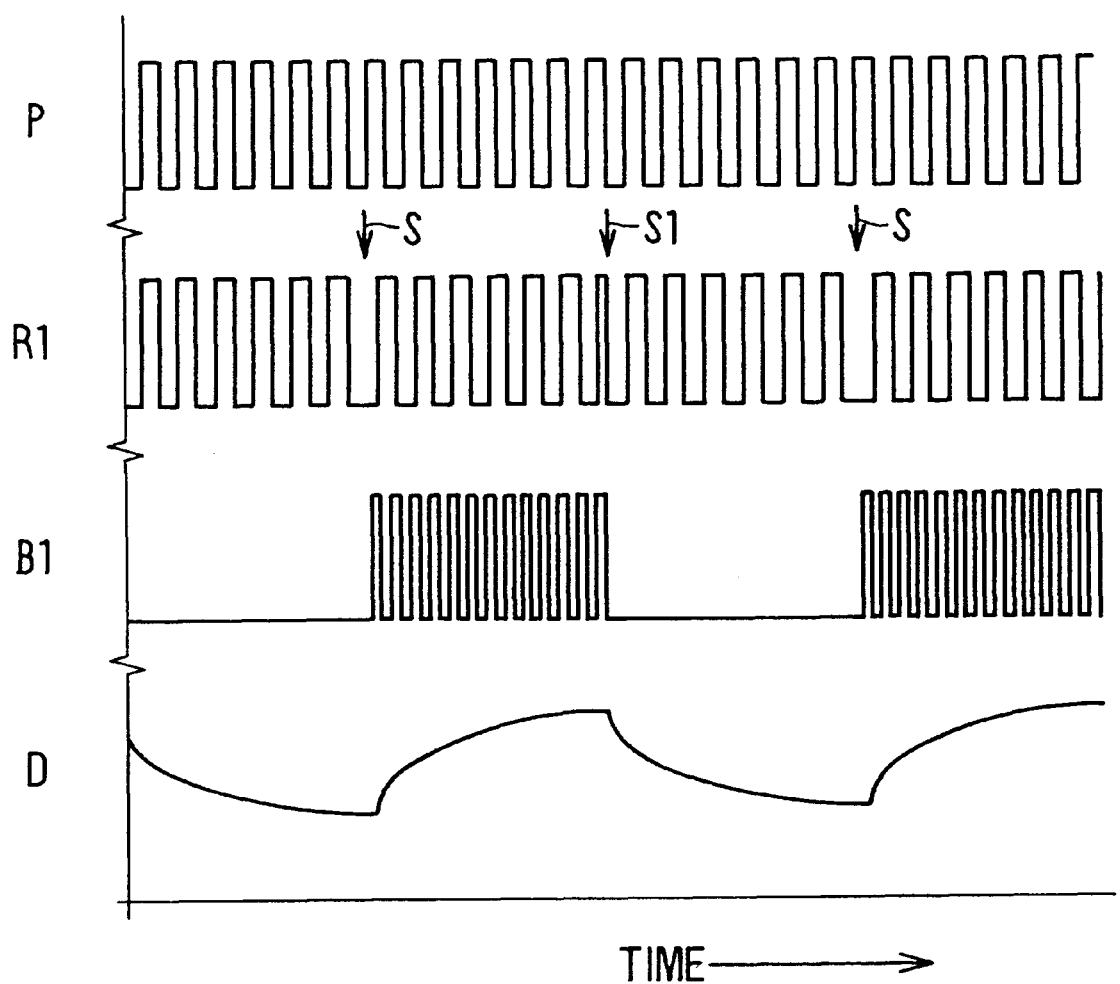

ENTERING DETECTING SYSTEM FOR VEHICLES

CROSS REFERENCE TO RELATED APPLICATION

This application relates to and incorporates herein by reference Japanese Patent Application No. 10-320960 filed on Nov. 11, 1998.

BACKGROUND OF THE INVENTION

1. Field of the Invention

The present invention relates to an entering detecting system for vehicles, and in particular to an intruding detecting system for vehicles suitable for detecting intruding of an unauthorized person by using a Doppler shift of an ultrasonic wave which occurs when a person enters a vehicle compartment.

2. Related Art

A conventional entering detecting system for vehicles of this kind is disclosed in U.S. Pat. No. 5,856,778 (JP-A-9-274080).

In this entering detecting system, an ultrasonic wave transmitter installed in a vehicle compartment transmits an ultrasonic wave into the vehicle compartment in response to an oscillation pulse of an oscillator circuit, and an ultrasonic receiver installed in the vehicle compartment generates a reception signal upon receiving the ultrasonic wave reflected by a person or the like in the vehicle compartment.

The reception signal is amplified by an amplifier circuit, and is output as a Doppler shift signal through a waveform shaper circuit, a phase difference output circuit (exclusive-OR gate) and a band pass filter. The reception signal is envelope-detected by an envelope detector circuit and is output as an envelope detector signal. Entering of person is detected from the Doppler shift signal after checking the level of the envelope detection signal, that is, after checking that the level of the reception signal is sufficiently large.

In the above entering detecting system, the level of the reception signal varies with variation in convection of air in the vehicle compartment. Specifically, the level of the reception signal abruptly varies due to abrupt variations in the interference of the ultrasonic wave, if the convection condition of air abruptly varies due to variations in temperature in the vehicle compartment or in the flow of wind entering from outside. Therefore, it is still likely that the level of the reception signal rises only temporarily because of the abrupt variation in the convection of air, while the level of the reception signal is normally low. For this reason, it is hard to detect entering of person with high accuracy, unless the period of continuation of the reception signal is monitored.

Further, if the amplifier circuit of the entering detecting system has an operational amplifier to amplify the reception signal by the operational amplifier, the phase of the amplified output of the operational amplifier greatly varies when a transistor such as an FET which is at the output stage of the operational amplifier saturates. The variation in the phase is output as the Doppler shift signal through the waveform shaper circuit, the phase difference output circuit and the band pass filter. As a result, entering of person may be detected erroneously even when no person actually enters the vehicle compartment.

It is assumed that the oscillator circuit generates the oscillation pulse (P in FIGS. 9 to 11) at 40 KHz and the waveform shaper circuit generates the waveform-shaped pulse (R in FIG. 9), under the condition that no person is entering the vehicle compartment. In this instance, the amplifier circuit generates the amplified output having a waveform indicated by A in FIG. 9 and the phase difference output circuit generates the phase difference output indicated by B in FIG. 9, unless the transistor such as an FET at the output stage of the amplifier circuit is not in saturation.

On the contrary, the operational amplifier generates the amplified output having the saturated waveform indicated by A1 in FIG. 10, the waveform shaper circuit generates the waveform-shaped pulse indicated by R1 in FIGS. 10 and 11 and the phase difference output circuit generates the phase difference output having the waveform indicated by B1 in FIG. 10, if the transistor such as an FET at the output stage of the operational amplifier is in saturation.

It is understood from this that each pulse width of the waveform-shaped pulse of the waveform shaper circuit and the phase difference output of the phase difference output circuit vary with the saturation of the transistor (arrow S in FIG. 11) and restoration from the saturation, that is, non-saturation (arrow S1 in FIG. 11). This means that the phase relation between the transmitted signal and the reception signal has changed. This phase change arises from the time required for the transistor such as an FET at the output stage of the operational amplifier to be restored from the saturation when it saturates.

As a result, a false Doppler shift signal is output through the band pass filter in the waveform indicated by D in FIG. 11, when the amplified output of the operational amplifier repeats saturation and non-saturation.

The phase difference output of the phase difference output circuit basically varies only when a reception signal frequency varies. However, the false Doppler shift signal is generated when the saturation and non-saturation of the amplified output of the operational amplifier occurs repeatedly, even if the reception signal frequency and the phase difference between the transmitted ultrasonic wave and the received ultrasonic wave do not vary. Thus, it is likely to occur that an occurrence of Doppler shift is caused by a person intruding into the vehicle compartment in response to the false Doppler shift signal.

Testing is conducted to study the relation between the Doppler shift signal (corresponding to a one cycle period of a Doppler shift) caused in response to the variation in temperature in the vehicle compartment when no one is entering the vehicle compartment and the level of the reception signal indicating the received ultrasonic wave. It is ascertained through this testing that the false Doppler shift signal was not generated if the level of the reception signal was high, while the false Doppler shift signal was generated when the level of the reception signal was high.

It is therefore possible to enhance the accuracy of detecting entering of person by basically determining that the Doppler shift signal is caused by entering of person when the level of the reception signal remains high for a sufficient period.

It also is ascertained that the transistor at the output stage of the operational amplifier does not saturate if the construction of associated circuits of the operational amplifier are improved.

SUMMARY OF THE INVENTION

It is therefore an object of the present invention to provide an entering detecting system for vehicles which prevents without fail an erroneous detection caused by a false Doppler shift occurring not in response to entering of person.

According to one aspect of the present invention, it is checked whether a level of a reception signal is higher than a predetermined level at every one cycle period of a Doppler shift signal in a predetermined monitor period, and an entering of person into a vehicle compartment is detected from a period of the Doppler shift signal each time the level of the reception signal is higher than the predetermined level.

According to another aspect of the present invention, a level of a reception signal is detected, and an entering of person into a vehicle compartment is detected from a detected level of the reception signal and a Doppler shift output. Here, the reception signal is amplified by an amplifier circuit including an operational amplifier. An amplified signal is limited to restrict saturation of the amplified signal. Thus, the amplified output of the operational amplifier is maintained stably without saturation. Therefore, the Doppler shift output is less likely to be generated erroneously due to the saturation of the amplified signal of the operational amplifier. As a result, the entering of person can be detected with high accuracy due to non-saturation of the amplified signal of the operational amplifier.

BRIEF DESCRIPTION OF THE DRAWINGS

FIG. 11 is a timing diagram showing in detail output waveforms of the major circuits under the condition that the amplified output of the operational amplifier of the amplifier circuit of the conventional entering detecting system for vehicles.

DETAILED DESCRIPTION OF THE PREFERRED EMBODIMENT

Embodiments of the present invention will be described with reference to the drawings.

First Embodiment

Figure 1:
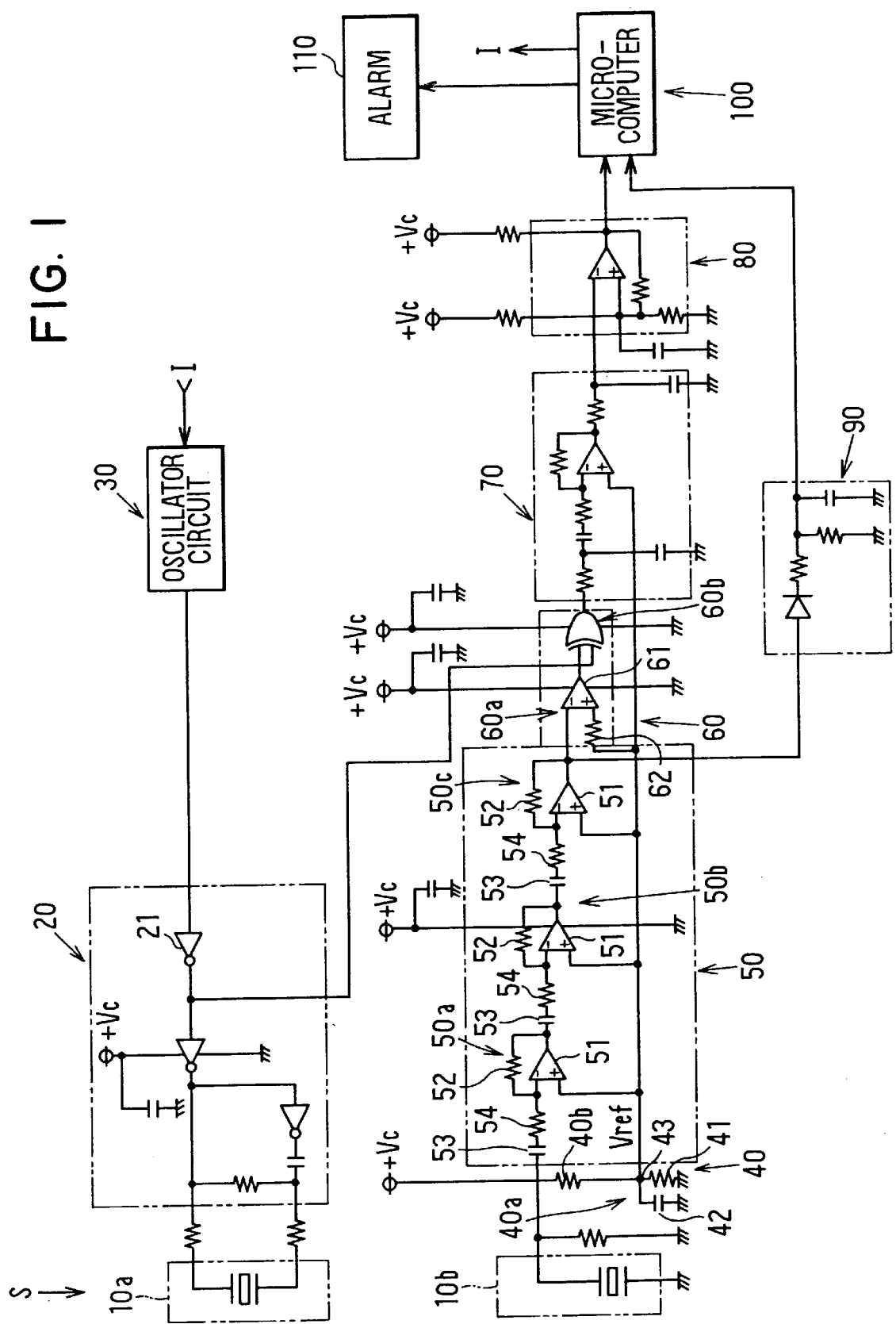
FIG. 1 is an electrical circuit diagram showing a first embodiment of the present invention.
Figure 2:
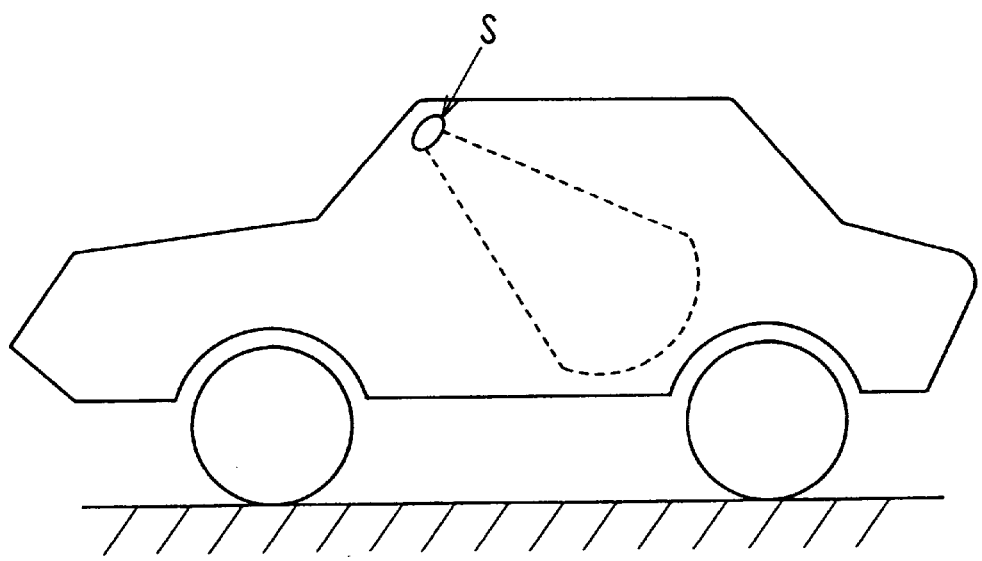
FIG. 2 is a schematic diagram showing a position of installation of an ultrasonic wave transmitter/receiver sensor shown in FIG. 1.

Referring first to FIG. 1, an entering detecting system has an ultrasonic wave transmitter/receiver sensor S which comprises an ultrasonic wave transmitter 10a and an ultrasonic wave receiver 10b. The sensor S is installed in the center of a front windshield upper edge in a vehicle compartment as shown in FIG. 2.

An oscillator circuit 30 is connected to the ultrasonic wave transmitter 10a through a transmitter circuit 20. The oscillator circuit 30 generates an oscillation pulse of an oscillation frequency f(=40 KHz) under control by a microcomputer 100. The transmitter circuit 20 has a circuit construction shown in FIG. 1, and outputs a transmission pulse to the ultrasonic wave transmitter 10a upon sequentially receiving the oscillation pulse from the oscillator circuit 30. Thus, the ultrasonic wave transmitter 10a transmits an ultrasonic wave in response to each transmission pulse from the transmitter circuit 20 so that it may be reflected in the vehicle compartment.

The ultrasonic wave receiver 10b receives the ultrasonic wave of the ultrasonic wave transmitter 10a reflected in the vehicle compartment, and outputs it to an amplifier circuit 50 as a reception signal. Here, if a person is entering the vehicle compartment, the frequency of the ultrasonic wave reflected by the person varies by $\Delta f$ due to Doppler shift effect. This means that the frequency of the reception signal is different from that of the transmission pulse by $\Delta f$.

A reference signal generator circuit 40 comprises a parallel circuit 40a of a resistor 41 and a capacitor 42, and a resistor 40b connected in series with the parallel circuit 40a. The reference signal generator circuit 40 divides a direct current voltage +Vc by the parallel circuit 40a and the resistor 40b, and generates a divided voltage from a common terminal 43 as a reference voltage Vref.

The amplifier circuit 50 has operational amplifier circuits 50a to 50c cascade-connected in three stages. The operational amplifier circuit 50a amplifies the reception signal from the ultrasonic wave receiver 10b based on the reference voltage Vref of the reference signal generator circuit 40 as a basis. The operational amplifier circuit 50b amplifies an amplified signal from the operational amplifier circuit 50a based on the reference voltage Vref of the reference signal generator circuit 40 as a basis. Further, the operational amplifier circuit 50c amplifies an amplified signal from the operational amplifier circuit 50b based on the reference voltage Vref of the reference signal generator circuit 40 as a basis.

Here, each of the operational amplifier circuits 50a to 50c has an operational amplifier 51, a feedback resistor 52 connected between an inverting input terminal and an output terminal of the operational amplifier 51, and a direct current cut-off capacitor 53 and an input resistor 54 which are connected in series to each other. A non-inverting input terminal of each operational amplifier 51 is connected to the common terminal 43 of the reference signal generator circuit 40. Each operational amplifier 51 has a transistor at its output stage.

A phase difference detector circuit 60 has a waveform shaper circuit 60a and an exclusive-OR gate (EXOR gate) 60b. The waveform shaper circuit 60a has a comparator 61. The comparator 61 receives an amplified signal from the operational amplifier circuit 50c and the reference voltage Vref from the reference signal generator circuit 40 through an input resistor 62. The comparator 61 generates a comparison signal at high level when the level of the amplified signal from the operational amplifier circuit 50c is lower than the reference voltage Vref. The comparison signal of the comparator 61 becomes low when the level of the amplified signal from the operational amplifier circuit 50c is higher than the reference voltage Vref. This means that the waveform shaper circuit 60a generates the comparison signal of the comparator 61 as a shaped signal.

The EXOR gate 60b generates, in response to a level change in an inverted pulse which is inverted relative to the oscillation pulse of the oscillator circuit 30 by an inverter 21 in the first stage of the transmitter circuit 20 and a level change in the shaped signal of the waveform shaper circuit 60a, a phase difference pulse signal indicative of a difference in phases of the inverted pulse and the shaped signal.

An amplifier circuit 70 has a circuit construction shown in FIG. 1. It extracts signal components corresponding to entering of a person from the phase difference pulse signal of the EXOR gate 60b, and amplifies the extracted signal components with respect to the reference voltage Vref of the reference signal generator 40 to produce a Doppler shift signal. The frequency of the Doppler shift signal corresponds to the difference in frequencies of the ultrasonic wave transmitted from the transmitter 10a and the ultrasonic wave received by the receiver 10b.

Figure 3:
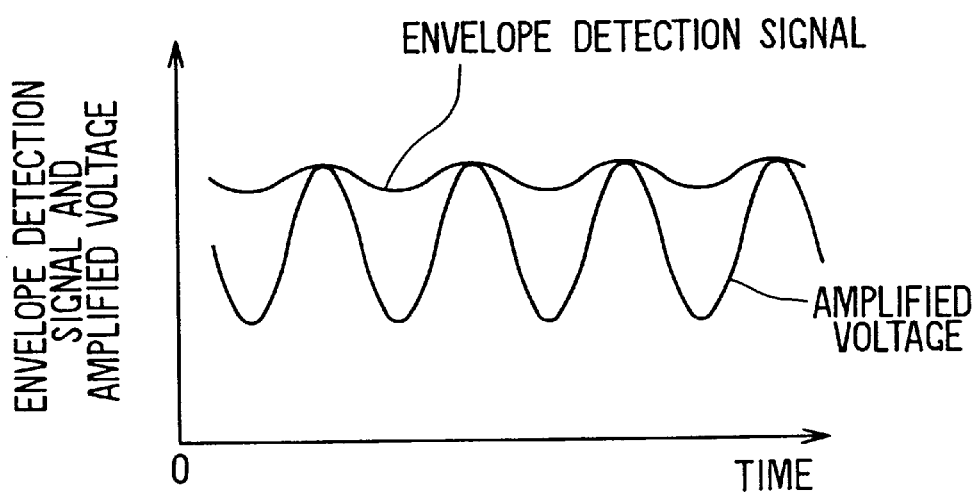
FIG. 3 is a timing diagram showing input and output signal waveforms of an envelope detector circuit shown in FIG. 1.

A waveform shaper circuit 80 has a circuit construction shown in FIG. 1, and generates a shaped Doppler pulse signal by shaping the Doppler shift signal of an amplifier circuit 70 into a pulse waveform. An envelope detector circuit 90 has a circuit construction shown in FIG. 1, and operates to detect a level of the reception signal. The envelope detector circuit 90 generates an envelope detection signal (FIG. 3) by detecting an envelope of an amplitude of the amplified voltage from the operational amplifier circuit 50c of the amplifier circuit 50.

Figure 4:
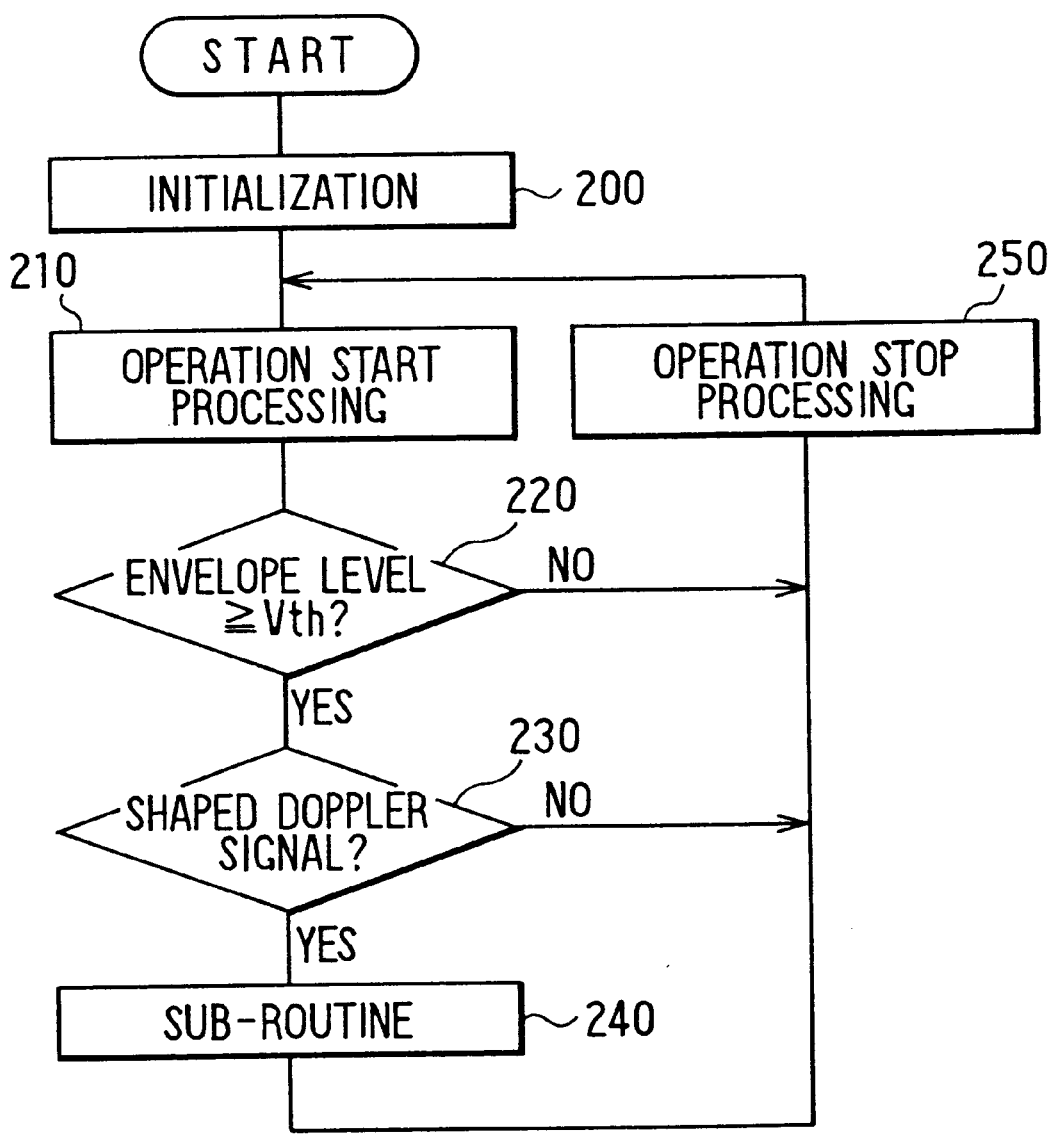
FIG. 4 is a flow diagram showing an operation of a microcomputer shown in FIG. 1.
Figure 5:
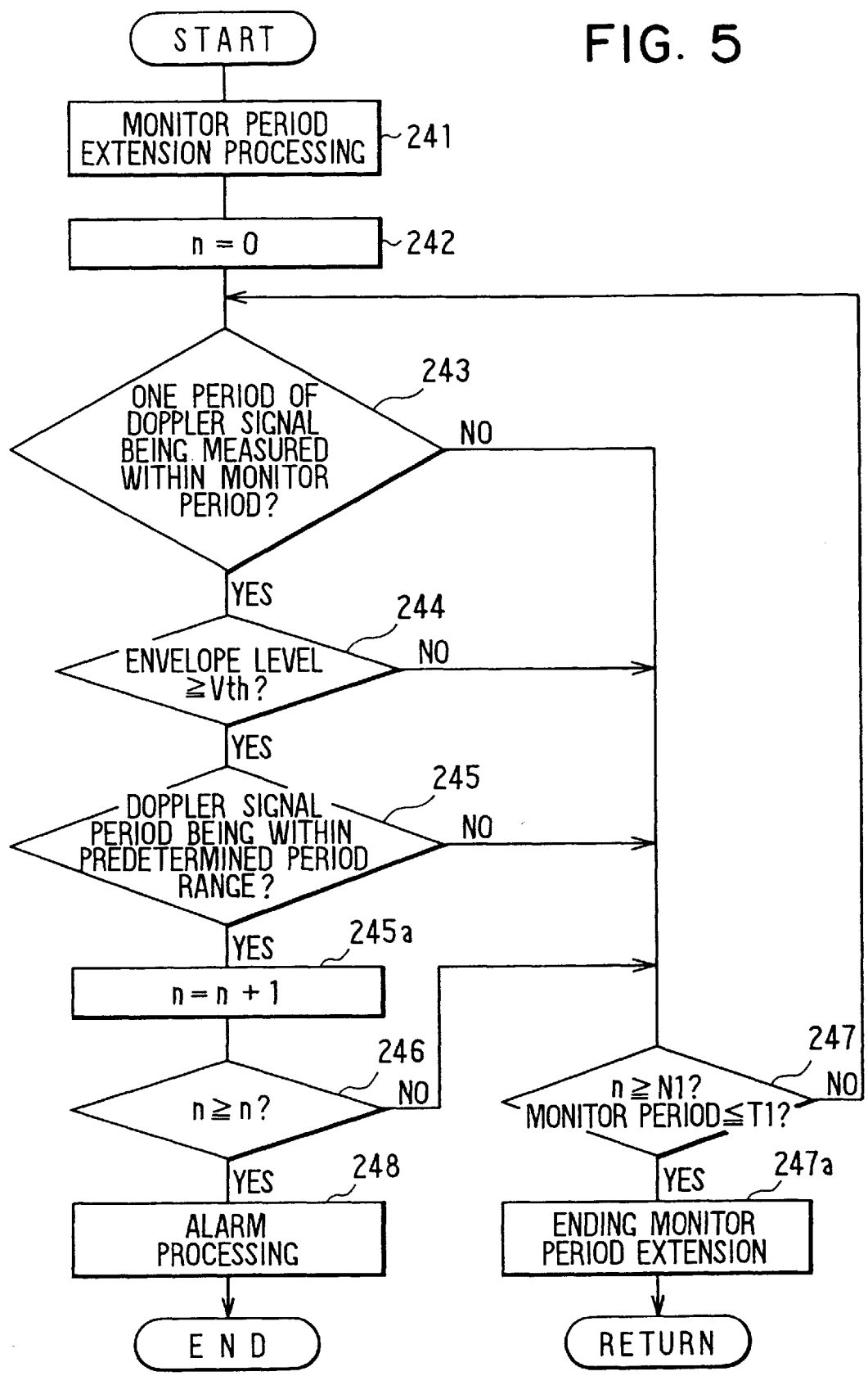
FIG. 5 is a flow diagram of a sub-routine in the flow diagram shown in FIG. 4.

The microcomputer 100 executes a computer program based on each output of the waveform shaper circuit 80 and the envelope detector circuit 90 as shown in flow diagrams of FIGS. 4 and 5. It executes a calculation processing required to check an unauthorized entering of a person in the execution of the computer program. The computer program is pre-stored in a ROM of the microcomputer. An alarm 110 is controlled by the microcomputer 100 to issue an alarm indicative of an unauthorized entering of person.

In the first embodiment, the system is rendered operative when doors of a vehicle (not shown) are locked by an authorized person who then leaves the vehicle, and inoperative when the doors are unlocked by the authorized person. That is, the system operates only while the vehicle is left at rest with its doors being held locked. When the system is rendered operative, the microcomputer 100 executes the computer program as shown in the flow diagram of FIGS. 4 and 5.

The microcomputer 100 is first initialized at step 200. Next, an operation start processing is executed at step 210 so that the oscillator circuit 30 outputs the oscillation pulse to the transmitter circuit 20 by its oscillation. The transmitter circuit 20 generates the transmission pulse in response to the oscillation pulse of the oscillator circuit 30, and the ultrasonic wave transmitter 10a transmits the ultrasonic wave into the vehicle compartment in response to the transmission pulse from the transmitter circuit 20 so that it may be reflected in the vehicle compartment.

The reflected ultrasonic wave is received as the reception signal by the ultrasonic wave receiver 10b. The reception signal is amplified by the amplifier circuit 50 and is produced as the amplified voltage from the operational amplifier circuit 50c at the final stage. Then, the amplified voltage is compared with the reference voltage Vref of the reference signal generator circuit 40 by the comparator 61 in the waveform shaper circuit 60a, and is produced as the shaped signal from the waveform shaper circuit 60a.

The EXOR gate 60b generates, in response to the level change in the inverted pulse which is inverted relative to the oscillation pulse of the oscillator circuit 30 by the inverter 21 and the level change in the shaped signal of the waveform shaper circuit 60a, the phase difference pulse signal by determining the difference in phases of the inverted pulse and the shaped signal.

The amplifier circuit 70 extracts a component corresponding to the entrance of person from signal components of the phase difference pulse signal of the EXOR gate 60b. The extracted component is amplified based on the reference voltage Vref of the reference signal generator circuit 40 as a basis, and the Doppler shift signal is generated. The waveform shaper circuit 80 shapes the Doppler shift signal into the Doppler waveform-shaped pulse signal which is output to the microcomputer 100. The envelope detector circuit 90 produces the envelope detection signal by detecting the envelope of the amplified voltage of the operational amplifier 50c in the amplifier circuit 50.

When the computer program proceeds to step 220, it is checked whether the level of the envelope detection signal of the envelope detector circuit 90 is higher than a predetermined level Vth.

The check result at step 220 is YES if the level of the envelope detection signal is higher than the predetermined level Vth. Then it is checked at step 230 whether there exists the shaped Doppler pulse signal of the waveform shaper circuit 80. The predetermined level Vth corresponds a lower limit level indicative of entering of person into the vehicle compartment.

The check result at step 230 is YES, if the shaped Doppler pulse signal is applied from the waveform shaper circuit 80 to the microcomputer 110. The computer program proceeds to the next sub-routine 240 shown in FIG. 5.

In the sub-routine 240, a monitor period Tmon of the shaped Doppler pulse signal from the waveform shaper circuit 80 is extended by a predetermined extension period ΔTmon at step 241, that is, $Tmon=Tmon+\Delta Tmon$ is calculated. At next step 242, a count data n indicative of the count relative to the number of the shaped Doppler pulse signal is set to n=0. The monitor period Tmon corresponds to the one cycle period of the shaped Doppler pulse signal, for instance.

Then it is checked at step 243 whether both conditions are met, the conditions being that the extended monitor period Tmon is within a predetermined period T and that the one cycle period of the shaped Doppler pulse signal has been measured within the extended monitor period. Here, the predetermined period T is set to be longer than the one cycle period of the shaped Doppler pulse signal but shorter than a period which corresponds to a predetermined number N.

If both conditions are met at this moment, the check result at step 243 is YES. Similarly to the processing at step 220, it is checked at next step 244 whether the level of the envelope detection signal of the envelope detector circuit 90 at the time of checking the period of the shaped Doppler pulse signal at step 243 is higher than the predetermined level Vth.

The check result at step 244 is YES, if the level of the envelope detection signal is higher than the predetermined level Vth. It is checked at step 245 whether the period of the shaped Doppler pulse signal is within a predetermined period range ΔTo. In this embodiment, the predetermined period range ΔTo corresponds to a range between a lower limit period A and an upper limit period B required to check entering of person into the vehicle compartment.

Thus, the check result at step 245 is YES, if the period of the shaped Doppler pulse signal is within the predetermined period range ΔTo. This means that the shaped Doppler pulse signal at this moment is a right signal arising from entering of person into the vehicle compartment. If the check result at step 245 is NO, on the other hand, the shaped Doppler pulse signal at this moment is an erroneous or false signal not arising form entering of person into the vehicle compartment.

If the check result at step 245 becomes YES as described above, the count data n is updated to n=n+1 at step 245a. Then the count data n is compared with the predetermined number N at step 246. The check result at step 246 is NO, because n=1 is smaller than N. The predetermined number N corresponds to a period which corresponds to the above extended monitor period Tmon=Tmon+ΔTmon).

Then, at step 247, the count data n is compared with a predetermined number N1 and the extended monitor period is compared with the predetermined period T1. The computer program returns to step 243 with the check result at step 247 being NO at this moment, This processing is the same, if the check result is NO at either step 243, 244 or 245. Thus, the electrical power is not wasted, even if the actual monitor period extends unnecessarily than the extended monitor period.

If the check result at step 247 is YES, no entering of person into the vehicle compartment is indicated. The extended monitor period is returned to the monitor period Tmon at step 247a.

While the processing from step 247 to step 246 is repeated after the check result of NO at step 246 as described above, the one cycle period of the shaped Doppler pulse signal is measured sequentially under a condition that the level of the envelope detection signal is higher than the predetermined level Vth. If the count data n indicative of the number of the shaped Doppler pulse signal becomes larger than the predetermined number N, the check result at step 246 becomes YES. Thus, according to the present embodiment, the entering of person into the vehicle compartment can be detected with high accuracy.

Finally, at step 248, an alarm processing is executed so that the alarm 110 indicates the entering of unauthorized person into the vehicle compartment. As a result, the entering of person into the vehicle can be alarmed with high accuracy.

It is to be noted that an operation stop processing is executed at step 250 after the check result of NO at either step 220 or step 230 or after the completion of processing of the sub-routine 240. As a result, the oscillation of the oscillator circuit 30 is stopped.

Second Embodiment

A second embodiment of the present invention will be described next with reference to FIGS. 6 and 7. In the second embodiment, an operational amplifier circuit 50d is used in place of the operational amplifier circuit 50c at the final stage in the amplifier circuit 50 of the first embodiment.

Figure 6:
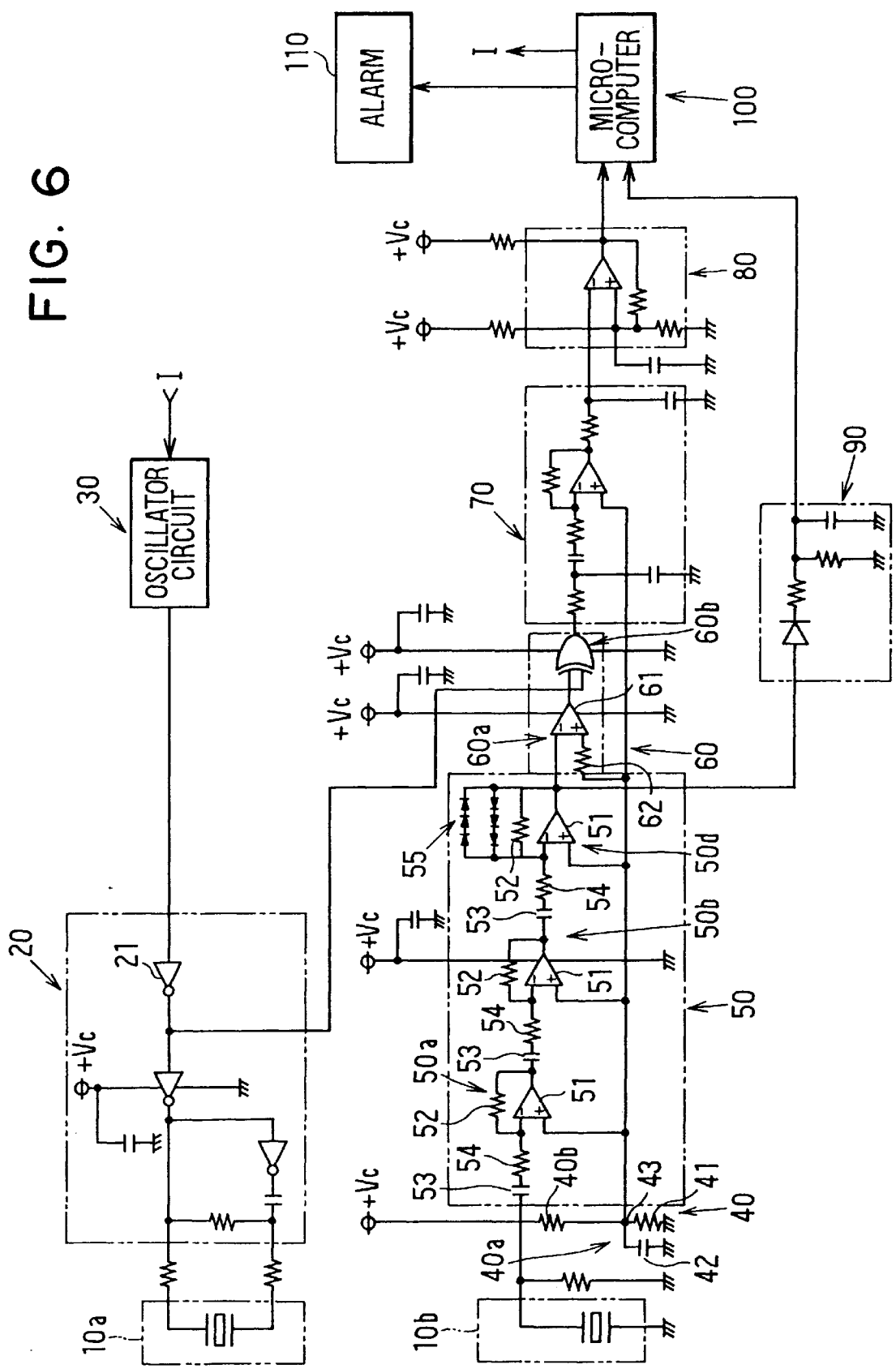
FIG. 6 is an electrical circuit diagram showing a second embodiment of the present invention.
Figure 7:
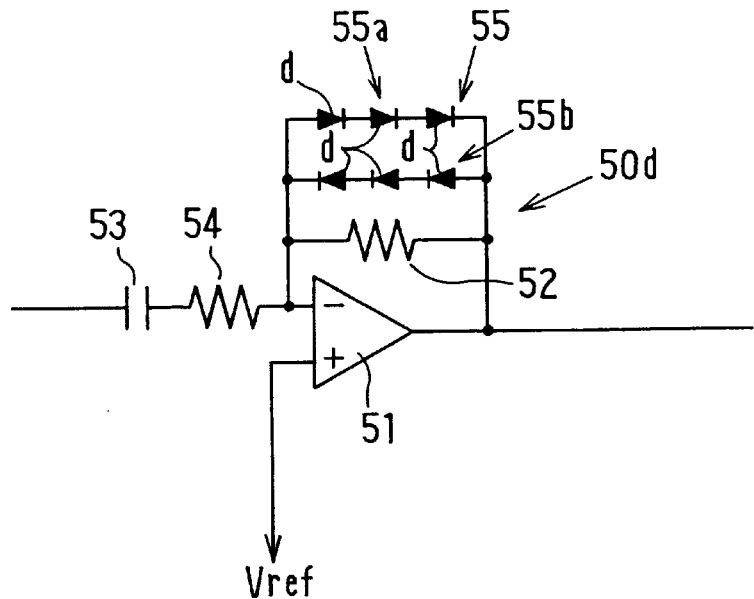
FIG. 7 is a circuit diagram of an output limiter circuit shown in FIG. 7.

The operational amplifier circuit 50d has a circuit construction in which an output limiter circuit 55 is added in the operational amplifier circuit 50c as shown in FIGS. 6 and 7. The output limiter circuit 55 has diode series circuits 55a and 55b which are connected in parallel with each other in a parallel relation with the feedback resistor 52.

The diode series circuit 55a has three diodes d connected in series in the same polarity. The diode d of the diode series circuit 55a shown at the leftmost side in FIG. 7 is connected to an inverting input terminal of the operational amplifier 51 at its anode. Further, the diode d of the diode series circuit 55a shown at the rightmost side in FIG. 7 is connected to the output terminal of the operational amplifier 51 at its cathode.

The diode series circuit 55b has three diodes d connected in series in the same polarity but in the polarity opposite to that of each diode of the diode series circuit 55a. The diode d of the diode series circuit 55b shown at the leftmost side in FIG. 7 is connected to the inverting input terminal of the operational amplifier 51 at its anode. Further, the diode d of the diode series circuit 55b shown at the rightmost side in FIG. 7 is connected to the output terminal of the operational amplifier 51 at its cathode.

Here, the output limiter circuit 55 operates to limit the amplitude of the output of the operational amplifier 51 so that its output does not saturate by preventing a reversal of phase of the amplified output of the operational amplifier 51 (that is, the output of the transistor which is at the final stage of the operational amplifier 51) by the diode series circuit 55a and the diode series circuit 55b.

The number of diodes in each of the diode series circuit 55a and 55b is determined in correspondence with the forward voltage drop of each diode. In the first embodiment, three diodes each having a forward voltage drop of 0.6 volts are used in each diode series circuit to ensure an amplitude of the operational amplifier 51 to 3.6 V at a maximum. The diodes are selected to ensure a sufficient amplitude, even when the forward voltage drop falls to 0.3 V due to temperature variations. Further, in opposition, the diodes are selected not to cause saturation of the output of the operational amplifier 51. The other construction is the same as in the first embodiment.

According to the second embodiment constructed as above, the output limiter circuit 55 limits the amplitude of the output of the operational amplifier circuit 50d by its diode series circuits 55a and 55b so that the amplified output of the operational amplifier 51, that is, the output of the transistor at the final stage of the operational amplifier 51, does not saturate.

As a result, the output of the operational amplifier circuit 50d can be ensured stably without saturation, and occurrence of erroneous shaped Doppler pulse signal from the waveform shaper circuit 80 which may occur when the output of the operational amplifier 51 saturates can be prevented without fail.

As a result, erroneous detection of entering of person arising from the saturation of the output of the operational amplifier 51 can be prevented without fail. The other operation and advantages are the same as in the first embodiment.

Therefore, according to the second embodiment, erroneous detection of entering of person arising from variations in temperature in the vehicle compartment or in the distance of reflection of the ultrasonic wave, and erroneous detection of person arising from the saturation of the output of the operational amplifier 51 can be prevented assuredly and synergetically.

Figure 8:
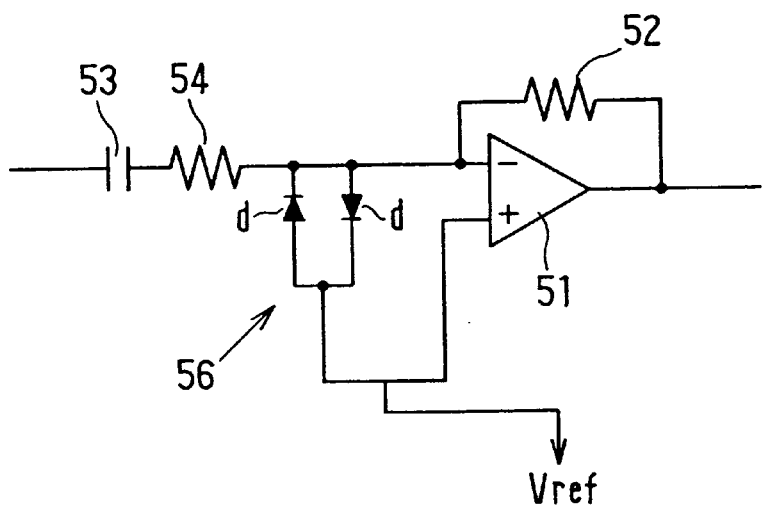
FIG. 8 is a circuit diagram showing a modification of the second embodiment.
Figure 9:
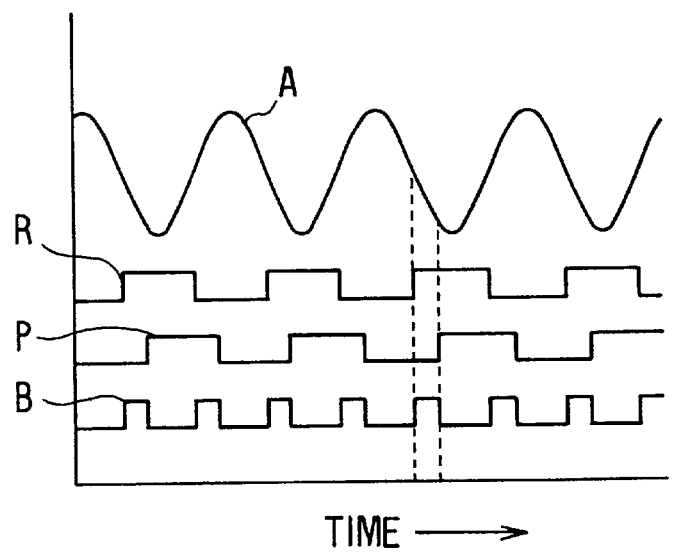
FIG. 9 is a timing diagram showing output waveforms of major circuits of a conventional entering detecting system for vehicles under a condition that an amplified output of an operational amplifier in an amplifier circuit is not in saturation.
Figure 10:
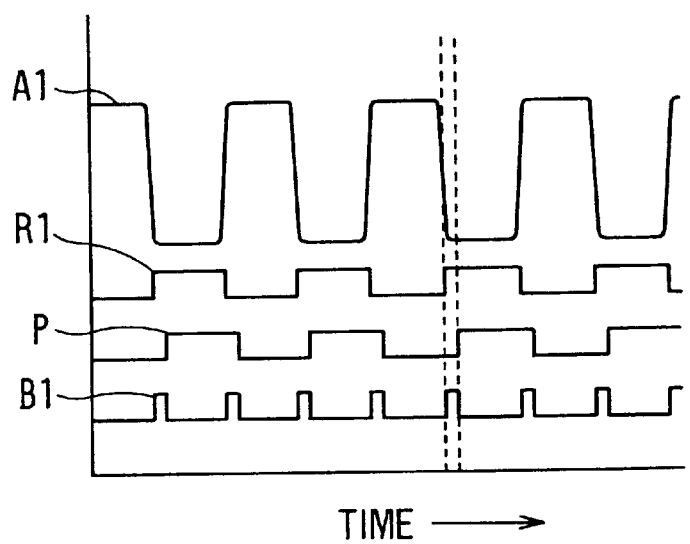
FIG. 10 is a timing diagram showing the output waveforms of the major circuits of the conventional entering detecting system for vehicles under a condition that the amplified output of the operational amplifier in the amplifier circuit is in saturation.

The second embodiment may be modified as shown in FIG. 8. In this modification, an output limiter circuit 56 is used in place of the output limiter circuit 55 in the operational amplifier circuit 50d described in the second embodiment.

The output limiter circuit 56 has diodes d which are connected in parallel and in opposite polarity with each other. The diode d of the output limiter circuit 56 shown at the left side in FIG. 8 is connected to the inverting input terminal of the operational amplifier 51 at its cathode. The anode of the diode d at the left side is connected to the common terminal 53 of the reference signal generator circuit 40.

The diode d of the output limiter circuit 56 shown at the right side in FIG. 8 is connected to the inverting input terminal of the operational amplifier 51 at its anode. The cathode of the diode d at the right side is connected to the common terminal 53 of the reference signal generator circuit 40.

In the same manner as the output limiter circuit 55, the output limiter circuit 56 prevents the saturation of the output of the operational amplifier 51 of the operational amplifier circuit 50d by limiting the amplitude of the input to the inverting input terminal of the operational amplifier 51 by the diodes d. This construction also provides the same operation and advantage as the second embodiment.

In practicing the present invention, the processing of sub-routine 240 by the microcomputer 100 described in the first embodiment may be omitted in the second embodiment.

Further, in practicing the present invention, the output limiter circuit 55 or 56 may be provided for all operational amplifiers of the amplifier circuit 50.

In addition, in practicing the present invention, each step in the flow diagram in each embodiment may be realized by a hard-wired logic circuits.

What is claimed is:

1. An entering detecting system for vehicles comprising:
   transmitter means for transmitting an ultrasonic transmission signal into a vehicle compartment;
   receiver means for receiving as a reception signal the ultrasonic transmission signal reflected in the vehicle compartment;
   Doppler shift output generating means for generating a Doppler shift signal from the transmission signal and the reception signal;
   reception signal level detecting means for detecting a level of the reception signal; and
   checking means for checking whether the level of the reception signal detected by the detecting means is higher than a predetermined level at every one cycle period of the Doppler shift signal in a predetermined monitor period, and checking an entering of person into the vehicle compartment from a period of the Doppler shift signal each time the level of the reception signal is higher than the predetermined level.

2. An entering detecting system for vehicles of claim 1, wherein:
   the checking means is for checking whether the period of the Doppler shift signal is within a predetermined period indicative of the entering of person into the vehicle compartment.

3. An entering detecting system for vehicles of claim 2, wherein:
   the checking means is for determining the entrance of person into the vehicle compartment when a condition that the period of the Doppler shift signal is within the predetermined period occurs a predetermined number of times in the predetermined monitor period.

4. An entering detecting system for vehicles of claim 1, further comprising:
   alarm means for issuing an alarm when the checking means determines the entrance of person into the vehicle compartment.

5. An entering detecting system for vehicles of claim 1, further comprising:
   amplifying means for amplifying the reception signal, the amplifying means including an operational amplifier for generating an amplified signal at an output stage thereof; and
   output limiting means for limiting an amplitude of the amplified signal thereby to restrict saturation of the amplified signal.

6. An entering detecting system for vehicles comprising:
   ultrasonic wave transmitter/receiver means including an oscillator for generating an oscillation signal, the transmitter/receiver means being for transmitting an ultrasonic transmission signal into a vehicle compartment in response to the oscillating signal and generating a reception signal upon receiving the transmission signal reflected in the vehicle compartment;
   amplifier means for amplifying the reception signal to generate an amplified signal;
   Doppler shift signal generating means for generating a Doppler shift signal from the amplified signal and the oscillation signal;
   reception signal level detecting means for detecting a level of the reception signal; and
   checking means for checking an entering of person into the vehicle compartment from the level of the reception signal detected by the detecting means and the Doppler shift signal,
   wherein the amplifying means includes an operational amplifier for generating the amplified signal at an output stage thereof, and the operational amplifier has output limiting means for limiting a change in phase of the amplified signal and restricting saturation of the amplified signal.

7. An entering detecting system for vehicles of claim 6, wherein:
   the operational amplifier has a feedback circuit; and
   the output limiting means is a diode series circuit in which diodes are connected in parallel and in opposite polarities to each other in the feedback circuit.

8. An entering detecting system for vehicles of claim 6, further comprising:
   reference voltage generating means for generating a reference voltage,
   wherein the amplifying means is for amplifying the reception signal based on the reference voltage, and the output limiting means is a diode parallel circuit in which diodes are connected to an input terminal of the operational amplifier in opposite polarities to each other thereby to limit an input of the operational amplifier based on the reference voltage.

* * * * *